R. McCULLY.
Car-Registering Apparatus.

No. 200,076. Patented Feb. 5, 1878.

Witnesses:
James Martin Jr
J. P. Theodore Lang

Inventor:
Robert McCully
by
Mason, Fenwick & Lawrence

R. McCULLY.
Car-Registering Apparatus.

No. 200,076. Patented Feb. 5, 1878.

Witnesses:
James Martin Jr.
J. P. Theodore Lang.

Inventor:
Robert McCully
by
Mason, Fenwick & Lawrence

UNITED STATES PATENT OFFICE.

ROBERT McCULLY, OF PHILADELPHIA, PENNSYLVANIA.

IMPROVEMENT IN CAR REGISTERING APPARATUS.

Specification forming part of Letters Patent No. 200,076, dated February 5, 1878; application filed November 10, 1876.

*To all whom it may concern:*

Be it known that I, ROBERT McCULLY, of the city and county of Philadelphia, and State of Pennsylvania, have invented a new and useful Improvement in a Car-Body and Fare-Registering Mechanism, which improvement is fully set forth in the following specification, reference being had to the accompanying drawings, in which—

Figure 1:
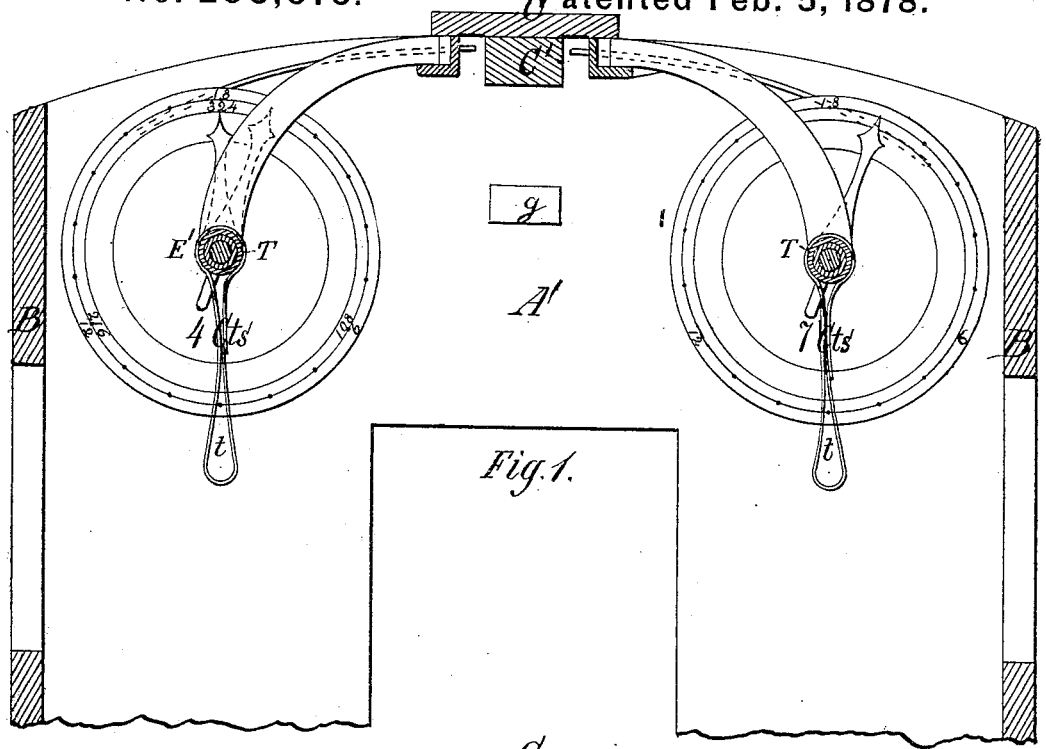
Figure 2:
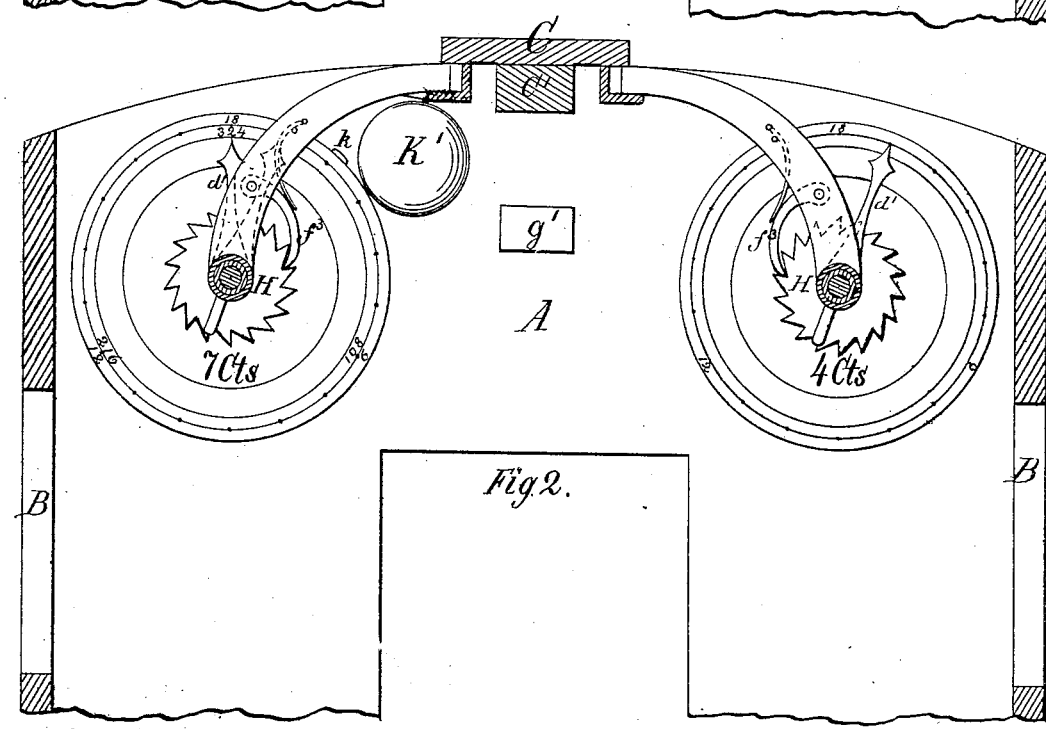
Figure 3:
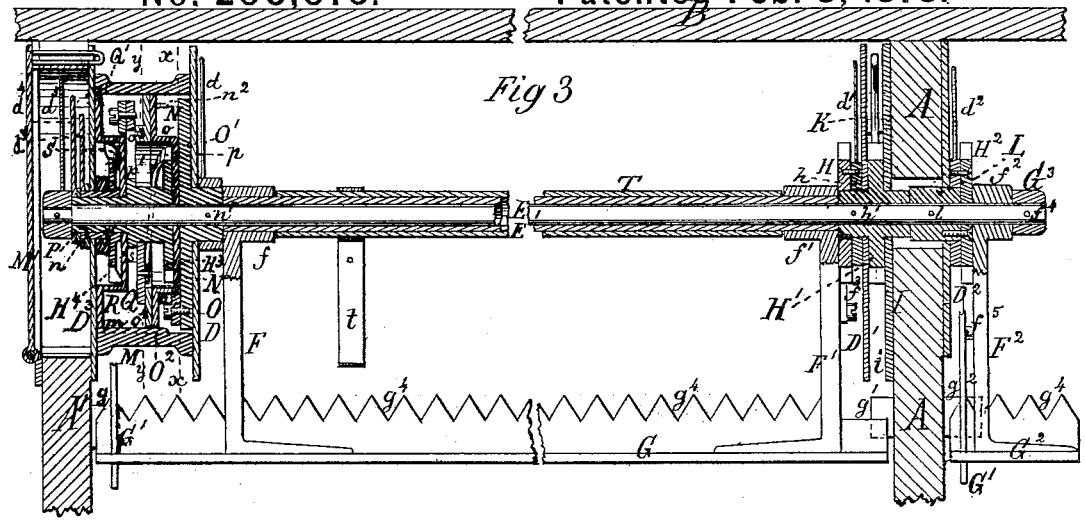
Figure 4:
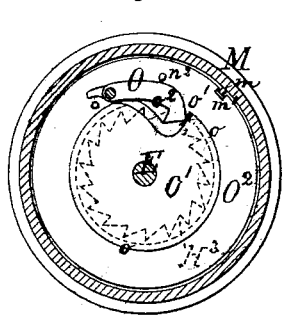
Figure 5:
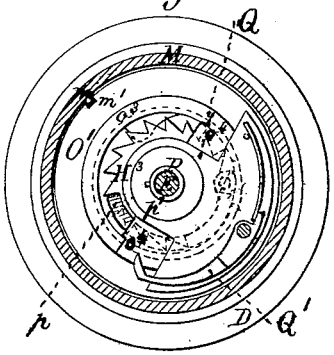
Figure 6:
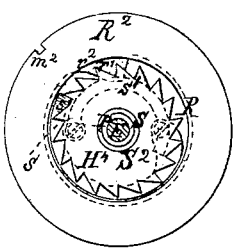
Figure 7:
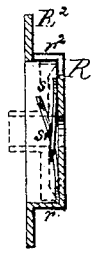
Figure 8:
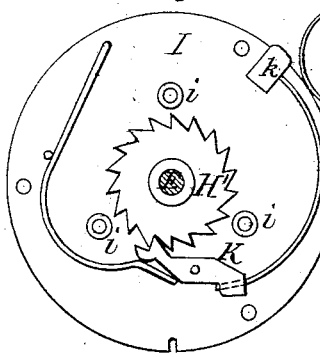
Figure 9:
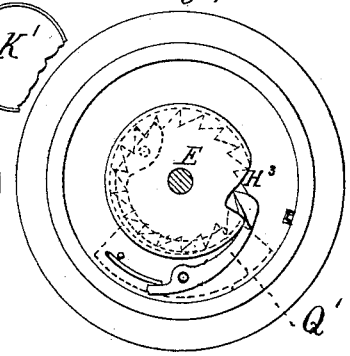
Figure 10:
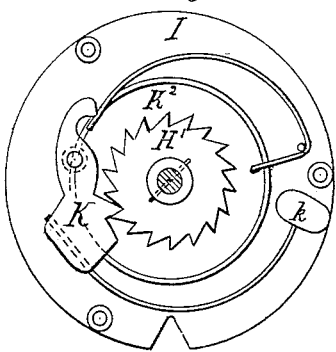

Figures 1 and 2 represent the said mechanism fastened to the ends of a car, showing the registering-dials in full. Fig. 3 is a horizontal central section through one of the main shafts, whereby the registering mechanism is supported. Fig. 4 is a transverse section in the line $x\ x$ of Fig. 3. Fig. 5 is a transverse section in the line $y\ y$ of Fig. 3. Fig. 6 is a front view of one of the counting-wheels, with its housing and spring-pawl. Fig. 7 is a longitudinal central section of the same, the wheel being shown with dotted outlines. Fig. 8 is an elevation of the alarm-bell mechanism. Fig. 9 is an elevation of a counting-wheel used for a simpler registering mechanism than shown in Figs. 4, 5, 6, and 7. Fig. 10 is an elevation of a modified alarm-bell mechanism.

The nature of my invention consists in certain constructions, combinations, and arrangements of parts, as hereinafter fully described and specifically claimed, whereby fare-registering mechanisms, or fare-registering and alarm mechanisms, are produced which constantly exhibit in duplicate, at suitable places on a car or other vehicle, by means of dials and fingers, the number of fares registered, and which may announce each registered fare by an alarm-blow upon a bell or gong, and which mechanisms may be operated by the conductor at any place inside the car, or on the platform of the same, by a single movement.

In the drawings, A A' represent the end walls of a car; B, the side walls; and C, the center-board of the roof, which latter is omitted to afford a better top view of the mechanism inside the car. The center-board C has a strengthening-rib, C', attached to its lower side.

The registering mechanism illustrated by the drawings consists, mainly, of a dial, upon which the so-called "unit section or circle" is made to count eighteen fares, which are registered by the next so-called "first multiplying section or circle" as No. 1. The said first multiplying-circle has also eighteen numbered divisions, and they are registered upon a third so-called "second multiplying section or circle" as 1. The said second multiplying-circle is also divided into eighteen numbered divisions, so that, in all, $18 \times 18 \times 18 = 5832$ can be counted.

Any other number besides eighteen would serve the same purpose—viz., counting the fares; but I avoid the use of the decimal counting and multiplying system, and adopt a more perplexing system, for the purpose of thwarting any attempt to cover fraudulent registering by interfering with the mechanism.

Each car is supplied with one of the above-described registers and one alarm bell or gong. A single dial, counting eighteen, is sufficient for the reckoning of the passengers, and I place one such dial on each end wall, inside the car, and one on the outside of the end wall, at the rear platform.

The multiplying-register above described, which is for the special use of the registering-clerk of the car company, may be placed on the outside of the end wall, at the front platform.

The said registering and alarm mechanisms are mounted upon and operated by one common arbor, E, which is passed longitudinally through the car near and above the windows so as not to annoy the passengers. Upon the said arbor E a tube, E', is fitted, and to this tube the hubs $f\ f^1$ of the operating lever-arms F F$^1$ are attached. The said lever-arms F F$^1$ are coupled by a longitudinal rod or bar, G, which may be angular or L-shaped, as shown in the drawings, and which is drawn down by the operator by means of a hook or other suitable instrument when a fare is to be registered. The said bar G is kept, by means of a spring, G$^1$, against the roof of the car, and its stroke is limited by two stopping-blocks, $g\ g^1$, at the ends of the car, so that the descent of the bar G upon the said blocks causes the registering of one fare.

The arm F$^2$ at the rear platform, outside the car, is provided with a hub, $f^2$, a short horizontal bar, G$^2$, a spring, G$^1$, and a stopping-block, $g^2$, all serving the same purpose of registering one fare by the descent of the said arm.

The arm $F^1$, inside the car, is provided with a spring-pawl, $f^3$, which engages with a ratchet-wheel, H, fastened upon the hub $h$ of another ratchet-wheel, $H^1$.

The ratchet-wheel H has a pointer or dial-finger, $d^1$, fastened to it, behind which a dial-plate, $D^1$, is fastened to a plate, I, by means of stays $i$. The plate I is screwed or otherwise fastened to the end wall A, and between it and the dial-plate $D^1$ the ratchet-wheel $H^1$ is inserted. The two ratchet-wheels H $H^1$ have the same number of ratchet-teeth, and they are fastened to the arbor E by a pin, $h'$, passed through the hub $h$ and the arbor.

A spring-pawl, K, with a hammer, $k$, attached to it, is operated by the teeth of the ratchet-wheel $H^1$, and caused to strike a gong, $K^1$, fastened to the car.

To the outside of the end wall A a dial, $D^2$, is fastened, the finger $d^2$ of which is fastened to a ratchet-wheel, $H^2$, which is fastened to a collar, L. The collar L is fastened to the arbor E by means of a pin, $l$.

Next to the ratchet-wheel $H^2$ the said hub $f^2$ of the lever-arm $F^2$ is fitted loosely on the arbor E, and a collar, $G^3$, with a pin, $f^4$, passing through it and the arbor, forms the end bearing of the hub $f^2$.

To prevent unauthorized persons from operating the bars G $G^2$, I provide the bars with a sharp and serrated edge, $g^4$, and the conductor of the car is supplied by the car company with a hook or other suitable tool to operate the said bars. A spring-pawl, $f^5$, attached to the arm $F^2$, operates the ratchet-wheel $H^2$.

To the opposite side $A'$ of the car a case, M, is fastened, to which a dial-plate, D, is attached, and through which the arbor E passes, with a multiplying registering mechanism upon it.

A disk or plate, N, is, by means of a hub, $n$, and a pin, $n^1$, fastened to the arbor E. The hub $n$ passes through the dial-plate D, and has in front of the dial a finger, $d$, fastened to it. The disk N has a spring-pawl, O, attached to it, which travels over the outer cylindrical surface $o$ of a case, $O^1$, which incloses a ratchet-wheel, $H^3$, upon or with a tube, P, fitted loosely on the arbor E. The surface $o$ has an open space, $o^1$, whereby the ratchet-wheel $H^3$ is reached and operated by the pawl O. The pawl O has a cam-plate, $o^2$, attached to its side, whereby it is lifted upon the surface $o$ after it has moved the ratchet-wheel $H^3$ the distance of one tooth.

The case $O^1$ is provided with a flange, $O^2$, which fits the inside of the case M, and is prevented from turning with the pawl O by a notch, $m^1$, fitted to a lug, $m$, in the said case. Opposite the space $o^1$ the flange $O^2$ is provided with a pin, $n^2$, which, by bearing upon the back of the pawl O, causes it to enter the said space $o^1$ and operate the ratchet-wheel $H^3$.

A spiral spring-pawl, $p$, fastened to the case $O^1$, bears upon and between the teeth of the ratchet-wheel $H^3$, and thereby prevents any movement of the same except that caused by the pawl O.

Bearing upon a rim, $o^3$, and a lid, $o^4$, of the case $O^1$, a crank-plate, Q, is loosely fitted upon the tube P, a collar, $p'$, of which forms the other side bearing of the said crank-plate, which is provided with a spring-pawl, $Q'$. On the other side of the collar $p'$ a case, R, and a ratchet-wheel, $H^4$, are loosely fitted upon the tube P.

The case R is rendered immovable in the case M by means of the lug $m$, and by means of a notch, $m^2$, in its flange $R^2$.

The spring-pawl $Q'$ travels upon the cylindrical outside surface $r$ of the case R, and, by means of an opening, $r^1$, in the said case, becomes engaged with the ratchet-wheel $H^4$, within which it moves one tooth forward, and from which it is disengaged by means of the cam-shaped side $r^2$ on the bottom of the said case.

The ratchet-wheel $H^4$ is kept in position and prevented from casual moving by two spiral spring-pawls, $s$ $s'$, diagonally arranged and fastened to the bottom of the case R.

A hub or tube, S, loosely fitted upon the tube P, is attached to the ratchet-wheel $H^4$.

A dial-plate, $D^3$, is fastened to the back of the case M, with the numbers for the single, the first multiplying, and the second multiplying mechanism upon its face. The tube S passes through the said dial $D^3$, and has attached to its end, and in front of the dial, a finger, $d^3$, for indicating the successive results of the second multiplication.

The tube P projects beyond the tube S, and is at its end provided with a finger, $d^4$, which serves to indicate the successive results of the first multiplication. Beyond the end of the tube P the arbor E is provided with a finger, $d^5$, which points out the single fares.

The described multiplying mechanism and the fingers and dial-plates connected therewith are especially protected by a massive case, as represented by M, and also by being inserted in the end wall $A'$ and covered up by a door, $M'$, to which no unauthorized person has access.

I have shown the described mechanism duplicated for the purpose of registering different classes of fares, as indicated by the following inscriptions upon the dials: "4 cts.;" "7 cts."

The figures 9 and 10 of the drawings represent modifications of the above-described parts—as, for instance, a ratchet-wheel, $H^3$, operated by a spring-pawl, $Q'$, without a lifting-cam, $o^2$, and with only one retaining spiral spring close to it, or an alarm mechanism, with a bell or gong, $K^2$, fastened to the arbor E.

A tube, T, incloses and loosely fits the tube $E'$, and to it the usual straps $t$, for the support of the standing passengers, are fastened, thereby preventing the said straps from being worn through by the movements of the tube $E'$, and at the same time preventing the straps from acting as friction-brakes upon the said tube E'. The said tube T protects also the tube E' from being twisted and operated by the hands of mischievous persons who would like to interfere with the apparatus.

It will be seen that all the ratchet-wheels and all the unit-fingers are rigidly connected with the arbor E, and they all move at the same time; and cannot show different accounts on the dials, and as all the ratchet-wheels are of the same size and construction, it is impossible for the conductor to sound an alarm without registering the fare received.

The general operation of my registering apparatus is illustrated by the foregoing description of the parts.

The described mechanisms may be used to register all kinds of fares in the shape of money, tickets, and so on, and they may be also adapted to register fares upon railroad-cars, steamboats, and similar means of transportation.

I am aware that pawls traveling upon a rigid cylindrical surface inclosing and partly exposing a thereby-operated ratchet-wheel are not new—such, for instance, being shown by the patent to C. S. Watson, December 27, 1859.

I, however, make the said rigid cylindrical surfaces removable from the case, and arrange the several pawl-and-ratchet devices longitudinally upon the central arbor, which has the advantage that all the parts may be removed at once from the case when inspection is necessary.

Another advantage is, that the construction of my described pawl-and-ratchet device is simpler, and the addition of one or more such devices to a multiplying apparatus would only slightly increase the thickness or height of its case, while in the above-mentioned patent the construction of a bottom plate of the case with concentric rims requires more labor, and the addition of another multiplying device increases the diameter of the case, and thus decreases the convenient use of the apparatus.

The main difference between my construction and that of Watson is this, that with an organization capable of doing what I have set forth I can use a stationary dial-plate with revolving fingers or pointers, while Watson, with his different organization, necessarily uses revolving dial-plates without pointers, and consequently adopts a much more complicated construction.

Having described my invention, what I claim is—

1. In a car or other vehicle, the combination of a number of registering devices arranged in different places, and for the convenient inspection of the passengers, the said registering devices being operated by one common central arbor, and by one single movement of the same, and the said central arbor constituting the usual hand or strap rail of the car, substantially as set forth.

2. The arbor E, supporting the operating-arms F $F^1$ $F^2$, in combination with a registering and an alarm mechanism, substantially as set forth.

3. The arms F $F^1$, in combination with the bar G, the spring-pawl $f^3$, and the ratchet-wheel H, substantially as set forth.

4. The combination of the plate N, having a pawl, O, the case $O^1$, having a space, $o^1$, in its surface $o$, the pin $n^2$, and the ratchet-wheel $H^3$, substantially as set forth.

5. In a car registering apparatus having a stationary indicating-plate with hands or pointers, the central arbor with revolving disk and spring-pawl O, having a cam, $o^2$, at its side, whereby it is lifted out of the space $o^1$ of the case $O^1$, and out of the teeth of the ratchet-wheel $H^3$, substantially as set forth.

6. The tube T, in combination with the oscillating tube E' and the revolving arbor E, substantially as set forth.

7. The arm $F^2$, having a bar, $G^2$, spring $G^1$, and spring-pawl $f^5$, substantially as set forth.

8. In a car registering apparatus having a stationary indicating-plate with hands or pointers, the ratchet-wheel $H^3$, having a spring-pawl, $Q'$, pivoted to a plate, Q, operated by the central arbor, in combination with the case R, having a space, $r^1$, in its surface $r$, and the ratchet-wheel $H^4$, substantially as set forth.

9. The case $O^1$, fitted loosely on the arbor E and into the case M, and being prevented from revolving by the notch $m^1$ and lug $m$, substantially as set forth.

10. The combination of a ratchet-wheel, $H^3$, and a spiral sidewise-operating spring-pawl, $p$, substantially as set forth.

11. The guard $g^4$, or equivalent, upon the bar G, for the purpose of preventing the operation of the said bar G by unauthorized persons, substantially as set forth.

12. The usual hand-rail E of a car, made to serve its regular purpose, and as a central operating and supporting shaft or arbor of an alarm and registering device or devices, substantially as set forth.

13. The hand-rail or strap-rail of a car-lever for operating a registering device, or an alarm and registering device, or a plurality of registering devices and an alarm, substantially as set forth.

Witness my hand, in the matter of my application for a patent for an improved car-body and fare-registering mechanism, this 4th day of November, 1876.

ROBERT McCULLY.

Witnesses:
J. STUART McKNIGHT,
WM. M. McKNIGHT.